(12) United States Patent
Chalk et al.

(10) Patent No.: US 9,703,064 B2
(45) Date of Patent: Jul. 11, 2017

(54) DURABLE OPTICAL FIBER RIBBONS AND METHODS OF MAKING OPTICAL FIBER RIBBONS

(71) Applicant: Corning Optical Communications LLC, Hickory, NC (US)

(72) Inventors: Julie Ann Chalk, Hickory, NC (US); Gregory Alan Mills, Clemmons, NC (US); Joel Laine Parker, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 15/238,042

(22) Filed: Aug. 16, 2016

(65) Prior Publication Data

US 2016/0356977 A1    Dec. 8, 2016

Related U.S. Application Data

(60) Division of application No. 14/575,156, filed on Dec. 18, 2014, now Pat. No. 9,442,262, which is a continuation of application No. 13/439,444, filed on Apr. 4, 2012, now Pat. No. 8,948,558, and a continuation of application No. PCT/US2010/051300, filed on Oct. 4, 2010.

(Continued)

(51) Int. Cl.
| | |
|---|---|
| *G02B 6/44* | (2006.01) |
| *B29C 35/04* | (2006.01) |
| *B29C 35/08* | (2006.01) |
| *B29L 11/00* | (2006.01) |

(52) U.S. Cl.
CPC .......... *G02B 6/4482* (2013.01); *B29C 35/045* (2013.01); *B29C 35/0805* (2013.01); *G02B 6/4403* (2013.01); *G02B 6/448* (2013.01); *B29C 2035/0827* (2013.01); *B29L 2011/0075* (2013.01)

(58) Field of Classification Search
CPC .... G02B 6/4482; G02B 6/4403; G02B 6/448; G02B 6/4498
See application file for complete search history.

(56) References Cited

U.S. PATENT DOCUMENTS

| | | |
|---|---|---|
| 5,761,363 A | 6/1998 | Mills |
| 5,828,071 A | 10/1998 | Bourghelle et al. |

(Continued)

FOREIGN PATENT DOCUMENTS

| | | |
|---|---|---|
| CN | 1186964 A | 7/1998 |
| CN | 1315297 A | 10/2001 |

(Continued)

OTHER PUBLICATIONS

An Overview of Key Ribbon Handleability Attributes, Lochkovic et al., IWCS 1997, p. 260.

(Continued)

*Primary Examiner* — Daniel Petkovsek
(74) *Attorney, Agent, or Firm* — William D. Doyle (57) ABSTRACT

Durable optical fiber ribbons are formed by promoting a strong bond between fiber ink layers and ribbon matrix material. During curing of the ink layer desired oxygen levels are maintained in the curing environment of the manufacturing process.

6 Claims, 7 Drawing Sheets

Related U.S. Application Data (60) Provisional application No. 61/249,332, filed on Oct. 7, 2009.

(56) References Cited

U.S. PATENT DOCUMENTS

| | | | |
|---|---|---|---|
| 5,933,559 A | 8/1999 | Petisce | |
| 6,195,491 B1* | 2/2001 | Jackson | G02B 6/4404 385/106 |
| 6,532,329 B1 | 3/2003 | Thompson | |
| 6,628,866 B1 | 9/2003 | Wilson et al. | |
| 6,678,449 B2* | 1/2004 | Thompson | G02B 6/4482 385/114 |
| 6,898,356 B2 | 5/2005 | Sato et al. | |
| 7,257,299 B2 | 8/2007 | Chien et al. | |
| 7,289,706 B2 | 10/2007 | Chien et al. | |
| 7,326,739 B2* | 2/2008 | Wilson | G02B 6/4404 522/173 |
| 7,414,081 B2 | 8/2008 | Greer | |
| 8,467,647 B2 | 6/2013 | Wells et al. | |
| 8,948,558 B2 | 2/2015 | Chalk et al. | |
| 9,442,262 B2* | 9/2016 | Chalk | G02B 6/4403 |
| 2007/0203258 A1 | 8/2007 | Sugimoto et al. | |

FOREIGN PATENT DOCUMENTS

| | | |
|---|---|---|
| CN | 1384926 A | 12/2002 |
| CN | 1845945 A | 10/2006 |
| CN | 201121165 Y | 9/2008 |
| EP | 1048966 A1 | 11/2000 |
| EP | 1408017 A2 | 4/2004 |
| JP | 63151648 A | 6/1988 |

OTHER PUBLICATIONS

Chinese Search Report for Application No. 2010080045385.3, Dec. 4, 2014, 2 pages.

Chinese Search Report, Application No. 2010800453853, Sep. 12, 2013, 2 pages.

Chinese Search Report, Application No. 2010800453853, May 8, 2014, 2 pages.

Patent Cooperation Treaty International Search Report and Written Opinion for International Application No. PCT/US2010/051300; mailing date Dec. 22, 2010, 11 pages.

* cited by examiner

DURABLE OPTICAL FIBER RIBBONS AND METHODS OF MAKING OPTICAL FIBER RIBBONS

PRIORITY APPLICATION

This application is a divisional of U.S. application Ser. No. 14/575,156, filed on Dec. 18, 2014, now U.S. Pat. No. 9,442,262, which is a continuation of U.S. application Ser. No. 13/439,444 filed on Apr. 4, 2012, now U.S. Pat. No. 8,948,558, which is a continuation of International Application No. PCT/USI0/51300 filed on Oct. 4, 2010, which claims the benefit of priority to U.S. Provisional Application No. 61/249,332, filed on Oct. 7, 2009, the entire contents of each of which are hereby incorporated by reference as if presented herein.

TECHNICAL FIELD

The present disclosure relates to compositions for fiber optic ribbon matrix materials and fiber optic ribbons that contain a matrix prepared from such compositions.

BACKGROUND

Optical fibers have acquired an increasingly important role in the field of communications, frequently replacing existing copper wires. This trend has a significant impact in local area networks (i.e., for fiber-to-home uses), which has seen a vast increase in the usage of optical fibers. Further increases in the use of optical fibers in local loop telephone and cable TV service are expected, as local fiber networks are established to deliver ever greater volumes of information in the form of data, audio, and video signals to residential and commercial users. In addition, use of optical fibers in home and commercial business environments for internal data, voice, and video communications is expected to increase.

Optical fibers are often bundled together to form an optical fiber ribbon. The ribbon includes side-by-side and parallel optical fibers that have been encased or encapsulated in a polymeric matrix material. The matrix portion of the optical fiber ribbon can include one or more layers of the polymeric matrix material, and each optical fiber typically contains a dual layer coating system that includes a soft, inner polymer coating and a hard, protective outer polymer coating. Prior to forming the ribbon, the optical fibers may also be coated with a thin colored layer of marking ink (i.e., in a polymer base) for purposes of fiber identification within the ribbon.

While the most basic function of the matrix materials is to secure the individual optical fibers or ribbon sub-units in a planar array, they also contribute to the handling properties of the ribbon. Two important handling attributes of conventional optical fiber ribbons are peel and breakout performance. Peel is the removal of matrix material from the optical fibers in either the mid-span region or the end of the optical fiber ribbon. It is considered desirable, for example, to be able to peel the matrix layers cleanly off the optical fibers without removing any of the colored marking ink layers. In addition, the matrix layers should be removable as an intact unit without breaking apart and leaving residue on the optical fibers. Breakout occurs at the ends of the ribbons and is used to provide access to individual fibers in a ribbon. As with peel, it is desirable to be able to remove all fibers without damage from the matrix material during breakout without it breaking apart and leaving residue on the optical fibers.

Conventional ribbon products have some degree of peel and breakout fiber access. There are various methods, designs and tools available to access fibers, and all require some limited or controlled "bond" between the fibers and the ribbon bonding matrix material. This bond is typically controlled by proper selection and design of the UV ink and matrix materials. The curing of the fiber ink color layer in an inert environment is also a requirement. The goal of the inert environment is to significantly reduce oxygen levels while curing (typically this is less than about 100 parts per million (ppm) oxygen in a nitrogen base environment). Oxygen, if present during curing at levels above about 100 ppm, will react with the free radicals formed for chain propagation and essentially stop the reaction at the outer surface of the ink color layer. In contrast, curing with an oxygen content at less than about 100 ppm provides a controlled bond between the fibers and the ribbon matrix, but ultimately reduces the toughness or durability of the ribbon. For example, when the ribbon is incorporated into a cable and pulled through tortuous paths and/or twisted, portions of the ribbon matrix may separate from the fibers and/or fracture at locations of high stress. "Twist failure" and other forms of ribbon damage may increase attenuation or even cause fibers to go dark.

SUMMARY

According to one embodiment, a multi-fiber ribbon has colored fibers with a secure bond to the ribbon matrix. The bonding yields a ribbon structure that is extremely robust and which can be calibrated to prevent individual fiber access.

According to one aspect, secure or permanent bonding is achieved by reducing the cure on the surface of the ink using oxygen levels greater than about 100 ppm when initially curing the colored ink. The color layers of one or more fibers are cured with a desired level of oxygen so that the color layer has a predefined level of surface cure. The fibers may then be further cured in a conventional manner using, for example, UV light to undergo further cross-linking of the color layer. Ribbons cured in this manner have higher toughness than conventional ribbons. For example, the ribbon has a higher twist to failure point, higher crush resistance and has higher resistance to delamination at the ink/matrix layer boundary than conventional ribbons.

While ribbons according to the present embodiments can be calibrated to be unsuitable for individual fiber access without damage to the ink layers or the fibers, they may have superior thermal strip properties. The fibers in the ribbon can accordingly be thermally stripped as a unit and mated as a unit to a multifiber connector, for example.

It is to be understood that both the foregoing general description and the following detailed description present embodiments of the invention, and are intended to provide an overview or framework for understanding the nature and character of the invention as it is claimed.

BRIEF DESCRIPTION OF THE FIGURES

The present embodiments are explained in more detail below with reference to the figures which show the exemplary embodiments.

DETAILED DESCRIPTION

The present embodiments relate to optical fiber ribbons and methods of making such ribbons. Oxygen inhibition is the effect of oxygen on the curing process which terminates or retards the rate of polymerization.

Figure 1:
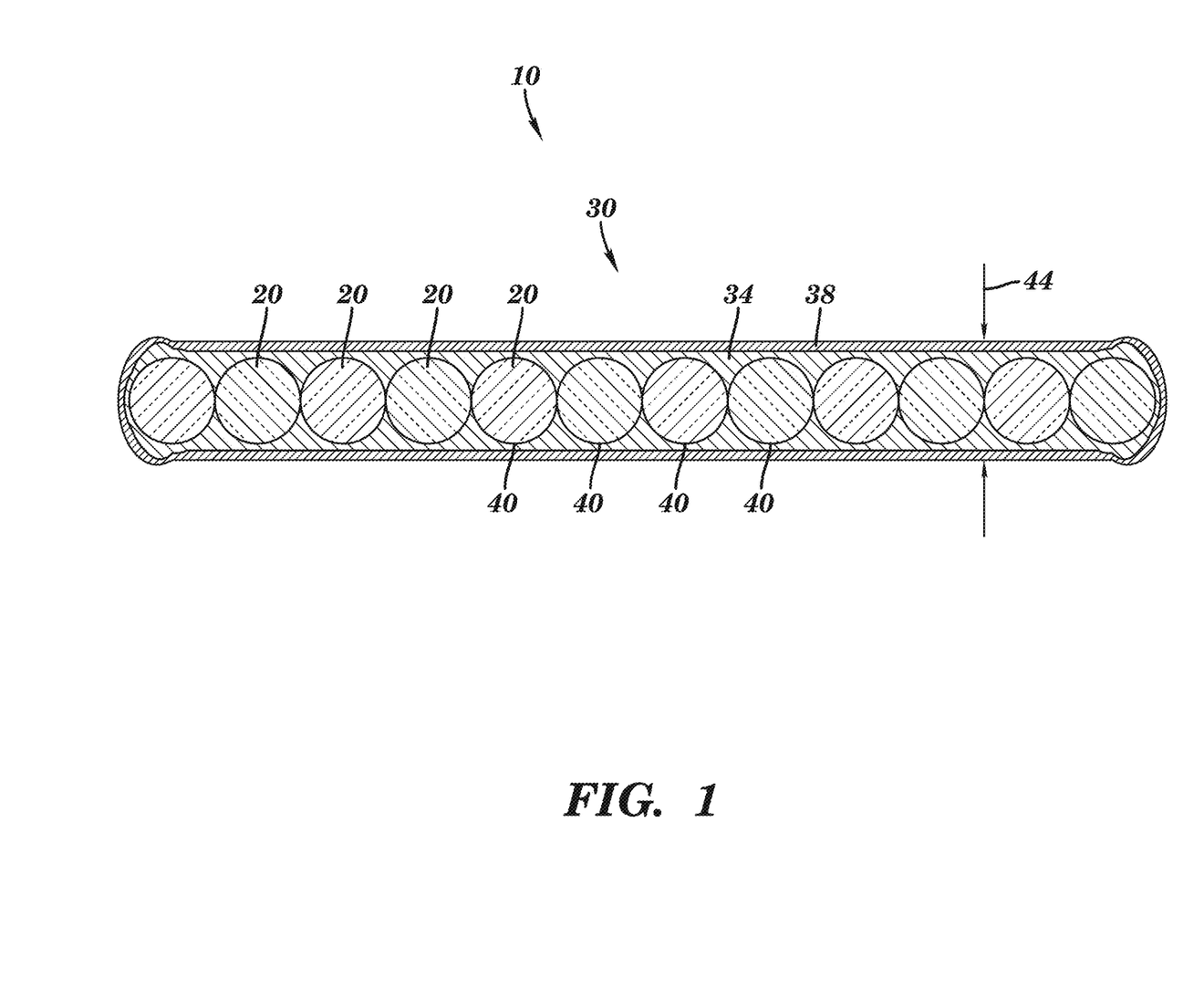
FIG. 1 is a cross-section of an optical fiber ribbon according to an embodiment of the present invention.

FIG. 1 is a cross-section of an optical fiber ribbon 10 incorporating matrix materials according to the present embodiments. The optical fiber ribbon 10 includes a plurality of substantially aligned optical fibers 20 that are surrounded by and encapsulated within a ribbon matrix 30. Each of the optical fibers 20 includes a glass fiber having one or more coatings (not shown). The ribbon matrix 30 can be either a single layer matrix or a dual layer matrix (formed of inner and outer matrix materials). In the illustrated embodiment, the matrix 30 includes an inner matrix 34 and an outer matrix 38. The inner matrix 34 surrounds and contacts the optical fibers 20, and the outer matrix 38 surrounds and contacts an outer surface of the inner matrix 34.

Each of the optical fibers 20 includes a colored ink coating layer 40 to allow for identification of individual optical fibers 20. The exemplary optical fiber ribbon 10 shown in FIG. 1 includes twelve optical fibers 20 arranged as a 1×12 ribbon. The colors for the colored ink coating layer can be a 12-color sequence of blue, orange, green, brown, slate, white, red, black, yellow, purple, rose, and aqua. The 1×12 ribbon may have a thickness 44 at its midsection in the range of, for example, from about 250 to about 330 microns. In the illustrated embodiment, the bond between the ink layers on the fibers and the matrix is calibrated such that the fibers are not individually accessible without damaging the fibers or the ink layers.

Figure 2:
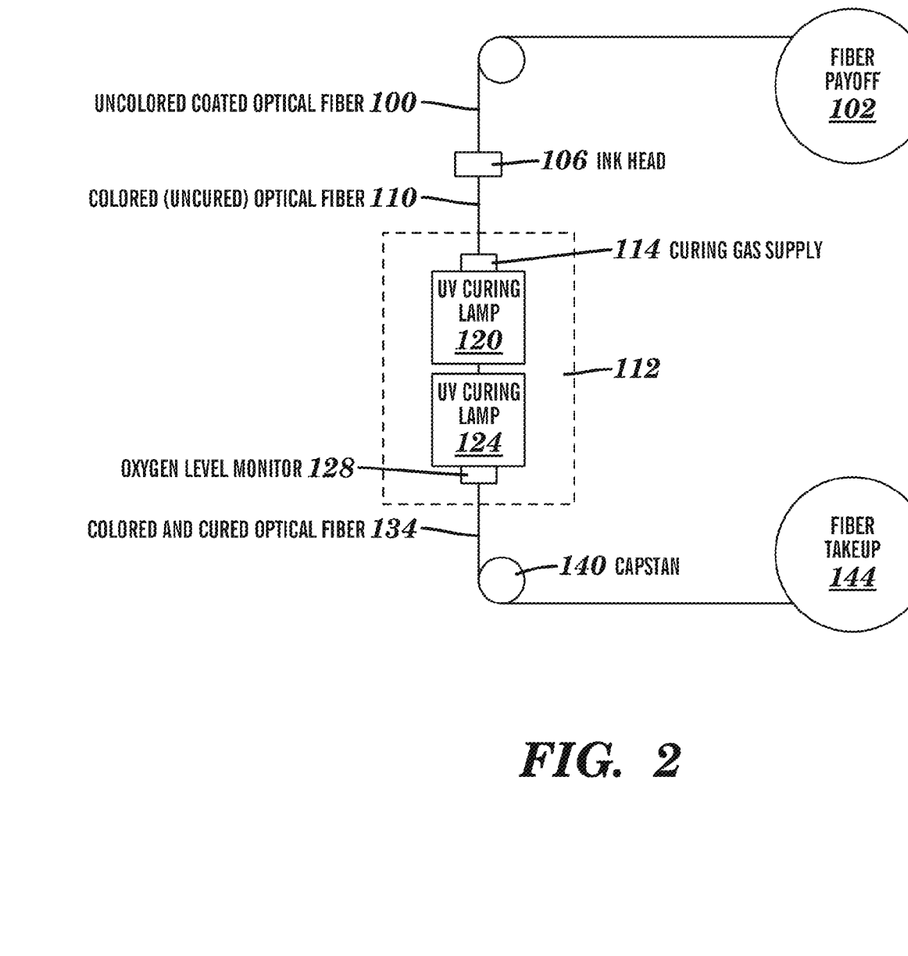
FIG. 2 is a schematic illustration of an ink layer application process.

FIG. 2 is a schematic diagram of a coloring line used to color a fiber to be incorporated into an optical fiber ribbon according to the present embodiments. In an exemplary process, an uncolored coated optical fiber 100 is paid off from a fiber payoff 102 and passed through an ink head 106 where a selected ink color is applied to the fiber 100. For a twelve-fiber ribbon as shown in FIG. 1, each fiber 20 can be coated with ink individually, or multiple fibers can be colored in a single device. In an exemplary embodiment, the fibers 20 are coated individually, stored on separate spools, and then moved to a matrix application process. The ink composition used to color the fibers can be, for example, ink compositions as described in U.S. Pat. Nos. 7,257,299 and 7,289,706, the contents of both patents being hereby incorporated by reference in their entirety. Other ink compositions are also suitable. The ink can be applied at a thickness in the range of, for example, from about 1 to about 10 microns, or more specifically, in the range of from about 2.5 to about 7 microns.

The colored but uncured optical fiber 110 then passes to a curing station 112. The curing station 112 includes a curing gas supply 114. The curing gas supply 114 provides a mix of nitrogen ($N_2$) and oxygen ($O_2$) gases, wherein the oxygen levels supplied to the curing process are higher than in conventional processes. The flow rates of the $N_2$ (typically 99.999% pure) and compressed air, which is about 21% $O_2$, are controlled using conventional flow meters and pressure regulators. The flow rates of the various gases are regulated and adjusted to achieve the desired $O_2$ level in the curing zone. The various gases can be provided from separate sources or from a single source. In accordance with the present embodiment, the level of $O_2$ gas supplied from the curing gas supply 114 to the curing zone is higher than the conventional level of about 100 ppm in a nitrogen base environment. The $O_2$ concentration can be, for example, at least about 1,000 ppm, preferably, at least about 5,000 ppm and more preferably, at least about 10,000 ppm in the curing zone. Preferably, the $O_2$ concentration can be from about 5,000 to about 210,000 ppm, more preferably from about 10,000 to about 100,000 ppm, most preferably from about 30,000 to about 70,000 ppm, and still more preferably about 50,000 ppm.

According to one embodiment, atmospheric air can serve as the curing gas. Atmospheric air, having an $O_2$ concentration of about 210,000 ppm, enables a strong bond between ink and matrix. The use of atmospheric air may be preferred because compressed air is relatively inexpensive and does not require handling of compressed $O_2$.

In the curing station 112, the colored uncured fiber 110 is advanced past two curing lamps 120, 124 that provide ultraviolet (UV) radiation to cure the ink applied to the fiber exterior. The presence of relatively high levels of oxygen in the ink curing process acts to inhibit curing on the surface of the ink layer. A conventional $O_2$ level monitor 128 can be included in the curing gas supply 114 to maintain the oxygen at desired levels. There are therefore cure-inhibited sites on the ink surface that can continue chain propagation when another layer of free radical curing material, such as matrix material, is placed in contact with the ink layer during, for example, a ribbonization process.

The colored and cured optical fiber 134, which generally corresponds to the fibers 20 shown in FIG. 1 before they are ribbonized, is then taken up around a capstan 140 and onto a fiber take-up spool 144 for use in a ribbonization process.

Fibers colored in accordance with the methods described herein can be incorporated into ribbons using known ribbonization processes and known inner and outer matrix compositions. According to the present embodiments, the matrix 30 comprises UV-curable ribbon matrix materials. For example, the inner matrix 34 can be formed from compound DSM 950-706 available from DSM Desotech, Inc. The outer matrix 38 can be formed from compound DSM 9D9-518. Other known matrix materials are also suitable. The inner and outer matrix materials can be cured using conventional processes. Because of the presence of the cure-inhibited portions of the ink layers of the fibers 20, when the inner matrix 34 material is applied to the fiber and subjected to UV irradiation, the uncured portions of the ink crosslink with the inner matrix material to create a strong bond between the ink and the ribbon matrix. The UV radiation may also serve to cure uncured portions of the ink.

According to the above-described method, a durable ribbon having high robustness and toughness can be produced using conventional apparatuses.

Figure 6:
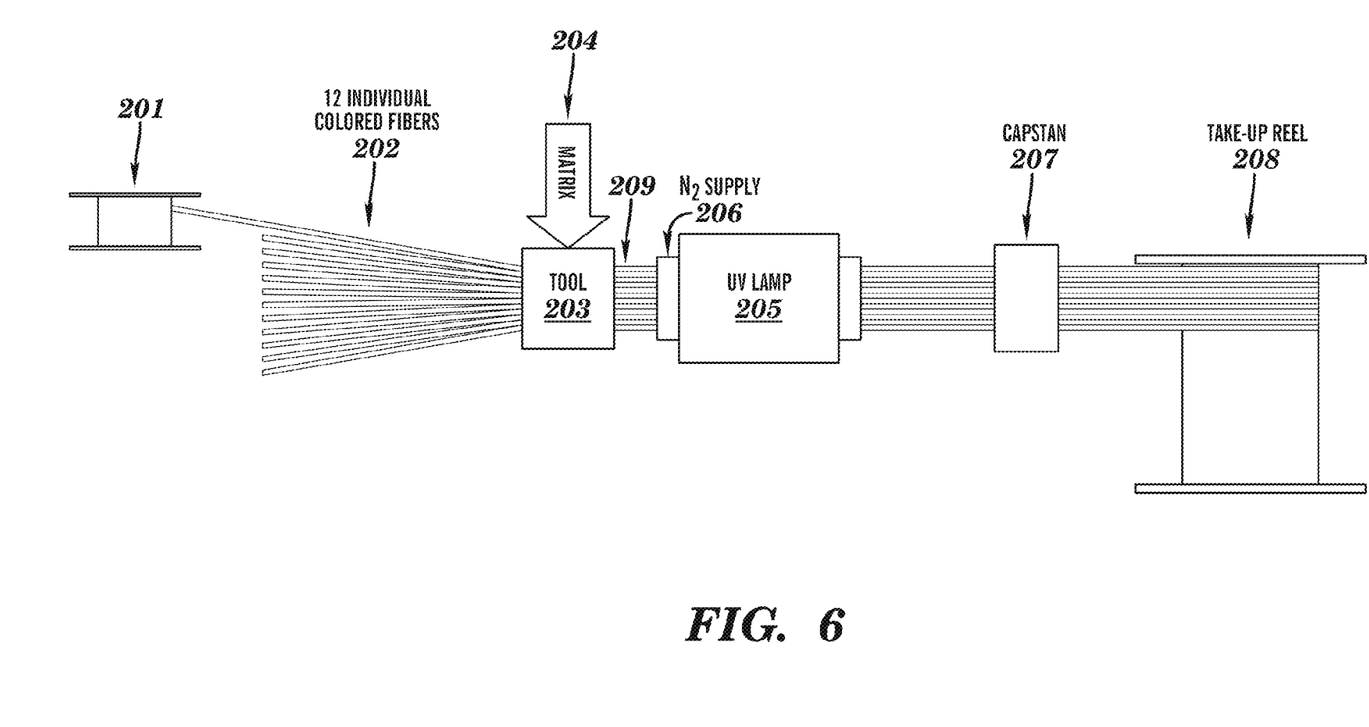
FIG. 6 is a schematic illustration of an optical fiber ribbon fabrication process according to an embodiment of the present invention.

FIG. 6 is a schematic diagram of a ribbon line used to join multiple optical fibers into a bonded array. In this example, 12 individual colored and cured optical fibers 202 on individual spools 201 are paid off and passed through a tool 203.

A ribbon bonding material or matrix 204 is applied while the fibers are arranged in a linear array. The coated linear array of colored fibers 209 is passed through a UV lamp 205 to cure the matrix. Nitrogen 206 is used in this curing to allow rapid cure on the surface and thus, form a non-sticky surface. During curing of the matrix material, the ink layer undergoes further cross-linking to create a strong bond between the ink and the ribbon matrix. The ribbon is pulled through the process at a controlled rate by a capstan 207 and the ribbon is put on a take-up reel spool 208 for storage. This bonded array of colored fibers is called a ribbon.

Figure 7:
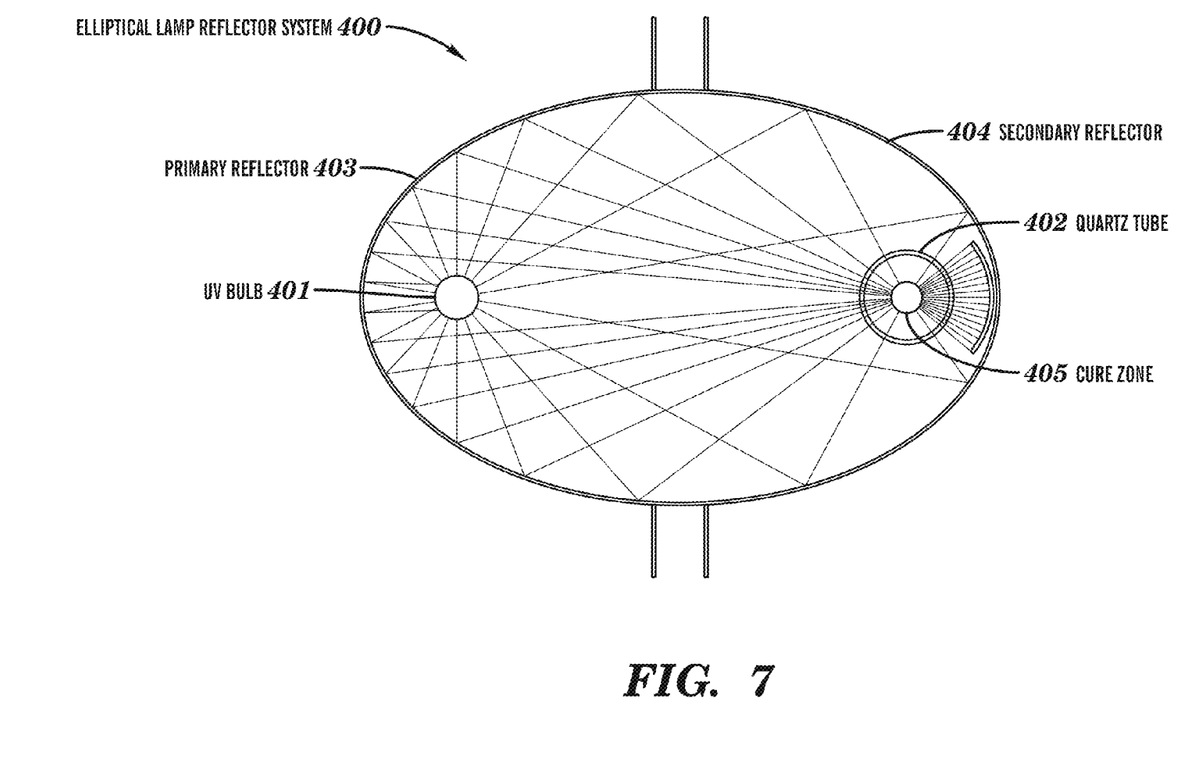
FIG. 7 is a cross-section of an elliptical reflector curing lamp system according to an embodiment of the present invention.

FIG. 7 is a cross-section of the elliptical reflector curing lamp system 400 for curing the color layer on the optical fiber. The elliptical reflector curing lamp system 400 is a subsystem located in each of the lamps 120 and 124 of FIG. 2. This system is typically made of two half reflectors, a primary reflector 403 which has the UV bulb 401 located at one foci point and a secondary reflector 404 which has a quartz tube 402 encircling the other foci point. The quartz tube 402, or any other material that transmits UV light to the cure zone, provides a seal for the controlled curing environment ($N_2$ and $O_2$ mixture). The colored fiber passes through the center of the quartz tube 402 in the cure zone 405 and the UV light cures the ink layer. The cure zone 405 diameter is typically less than or equal to the inside diameter of the UV bulb 401.

According to the above embodiments, ribbons can be produced of superior toughness and resistance to delamination. The ribbons also have high twist to failure points and crush resistance. Ribbons produced according to the methods discussed herein may be calibrated to prevent individual fiber access, but have superior thermal strippability.

EXAMPLES

Example 1

Coloring Process Parameters

The ink applied to the fiber is formulated so as to be hardened or cured by exposure to UV light. UV light of desired wavelength will provide sufficient energy to initiate a free radical reaction which will cross-link the liquid ink into a hardened ink layer. After the ink layer is applied by ink head 106 to an optical fiber 100, the colored uncured fiber 110 enters a UV curing lamp 120 in the curing zone 112 of FIG. 2. The speed at which any UV curable material can be processed is related to the total UV exposure. In the curing of optical fiber and inked optical fiber the curing speed is typically a function of the curing lamp, bulb type, bulb size and system power. The present examples used the following curing conditions. The ink was applied to a thickness of from 3 to 10 microns. The line speed was 1500 m/min. 2 Fusion 6000 watt lamps were used in curing station 112 of FIG. 2. Each of the lamps 120 and 124 contained focused elliptical reflectors 400, as shown in FIG. 7. Each of the Fusion lamps were 600 watt/in. lamps having 10" long 11 mm D bulbs. The resulting UV exposure to the fiber was equal to 20.3 msec.

Matrix peel qualities can be evaluated and quantified using a matrix peel test. One procedure for testing peel is as follows: 1. using a roughly 12 inch sample of ribbon 10, hold the top end of the ribbon with the thumb and index finger about 1 inch from the end and twist the ribbon end 90° in one direction and then 90° in the other direction—the matrix material 30 should break loose from the fibers 20; and 2. grasp the matrix layer 30 on one side of the ribbon and pull down to remove the matrix 30 from the fibers 20. Rate the peel according to the scale detailed in Table 1.

TABLE 1

Peel Rating Scale: Ribbon applied to carpet tape on peel board

| Rating | Rating Criteria |
|---|---|
| 1 | All coating peels cleanly the full length from both sides of the ribbon and no residue on any fiber. |
| 2 | All coating peels cleanly the full length from both sides of the ribbon but residue remains on the edge fiber that can be easily removed. |
| 3 | The coating peels cleanly on one side only. |
| 4 | The coating can only partially be peeled from either side |
| 5 | The ribbon coating will not peel from the ribbon. |

Breakout qualities for a 12 fiber ribbon undergoing fiber breakout for the first fiber can be evaluated and quantified using the following procedure: 1. using a roughly 18 inch ribbon 10 sample, hold the top end of the ribbon 10 with the thumb and index finger at about 1 to 2 inches from the end of the ribbon 10 and twist the ribbon end 90° in one direction and then 90° in the other direction—the matrix material 30 should break loose from the fibers 20; 2. remove the end fiber and remove any matrix 30 from the end fiber; and 3. grasp the remaining 11 fibers 20 with one hand and hold the matrix 30 with the other hand and attempt to remove the 11 fibers 20 all at once. When all the fibers have been removed, examine the matrix 30 for damage and rate the 12 fiber breakout performance according to the rating scale detailed in Table 2.

TABLE 2

12 Fiber Breakout Rating Scale

| Rating | Rating Criteria |
|---|---|
| 1 | Fibers were easily removed, matrix shell is undamaged. |
| 2 | Fibers were removed without damage to the matrix shell, but the matrix separates into 2 strips. |
| 3 | Fibers were removed from the matrix, but the shell is damaged with several spots where the matrix stuck to the fibers. |
| 4 | Fibers were removed from the matrix, but the shell was significantly damaged with lots of areas where the matrix stuck to the fibers, or the matrix is shredded. |
| 5 | Fibers cannot be removed from the matrix. |

Single fiber breakout qualities for a 12 fiber ribbon can be evaluated and quantified using the following procedure: 1. using a roughly 18 inch ribbon 10 sample, hold the top end of the ribbon 10 with the thumb and index finger at about 1 to 2 inches from the end and twist the end 90° in one direction and then 90° in the other direction. The matrix material 30 should break loose from the fibers 20; 2. remove the end fiber and remove any matrix 30 from the end fiber 20; and remove the remaining fibers 20 one at a time. Rate the overall single fiber breakout of the ribbon 10 according to the rating scale detailed in Table 3.

TABLE 3

Single Fiber Breakout Rating Scale

| Rating | Rating Criteria |
|---|---|
| 1 | Fibers remove easily from matrix and matrix stays in a cohesive shell. |
| 2 | Fibers release from matrix in a jerky fashion, however, matrix forms a cohesive shell. |

TABLE 3-continued

Single Fiber Breakout Rating Scale

| Rating | Rating Criteria |
|---|---|
| 3 | Fibers remove easily from matrix, but shell separates into two strips. Some flaking of the matrix shell may occur. |
| 4 | Matrix adheres to at least one fiber, other than end fiber, during breakout. |
| 5 | Cannot remove fiber from the matrix. Color layer is removed or fiber breaks. |

Example 2

NPR Performance by $O_2$ Level

No peel ribbons (NPR) are defined as ribbons that will not peel or have fiber access (during either 12 fiber breakout or single fiber breakout testing). A rating of 5 indicates the ribbon will not peel or allow fiber breakout. This rating is consistently achieved by ribbons prepared when the oxygen level during curing of the coloring layer is 10,000 ppm or greater, as shown in the table below. However, satisfactory results could be achieved by ribbons prepared when the oxygen level during curing of the coloring layer is between about 1,000 and about 10,000 ppm depending on material and processing conditions. These effects can be optimized by reducing the cure dose to the fiber, for example, by increasing the line feed, reducing the lamp intensity, or modifying the material composition, for example, by increasing the photoinitiator concentration, and the like.

NPR prepared in accordance with the present embodiments show improved peal and breakout performance over standard peel ribbons (SPR) prepared in accordance with the prior art, as shown in the table below. Moreover, at oxygen levels of 100,000 ppm during curing of the coloring layer care must be taken to avoid processing problems in removing the fibers from the reel.

Average of 5 Ribbon Samples

| $O_2$ (ppm) | Peel Rating | Breakout Rating |
|---|---|---|
| <100 | ≤2 | ≤2 |
| 1,000 | 4.17 | 3.25 |
| 10,000 | 5.00 | 5.00 |
| 25,000 | 5.00 | 5.00 |
| 50,000 | 5.00 | 5.00 |
| 75,000 | 5.00 | 5.00 |
| 100,000 | 5.00 | 5.00 |

NPR should always have ratings of 5

Example 3

NPR Twist Performance

Figure 3:
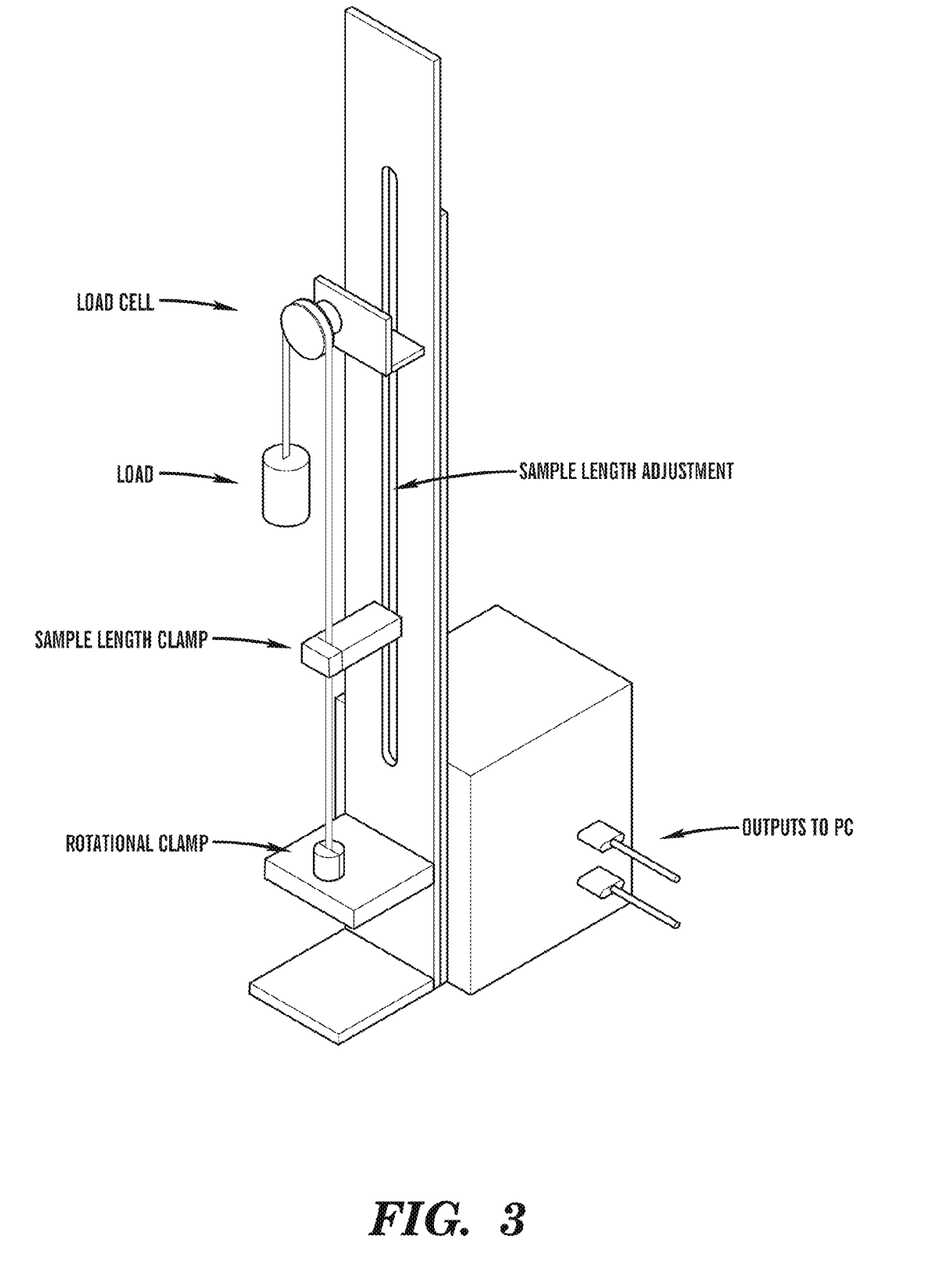
FIG. 3 illustrates a device for testing twist properties of optical fiber ribbons.

FIG. 3 illustrates a device for measuring the twist properties of optical fiber ribbon. FOTP-141 is a known standard that measures twist cycle properties of ribbons. FOTP-141 states that a 300 mm long sample of ribbon must withstand 20 cycles at 15 to 20 twist cycles per minute. A cycle consists of rotating the ribbon 180° clockwise, 360° counterclockwise, then 180° clockwise. In a twist-to-failure test, a ribbon sample is loaded on the twist bench and twisted about itself in one direction until the matrix fails. Failure is detected by the load cell and the failure rotation point is recorded by a computer. For ribbons, failure can be detected as delamination of the matrix/color interface or matrix breaking between two fibers.

NPR prepared in accordance with the present embodiments show improved twist performance over SPR prepared in accordance with the prior art, as shown in the table below. The resulting increased twist-to-failure (TTF) is consistent over temperatures of from 135° C. to 175° C. for up to 30 minutes.

All NPR in the table below were manufactured using 50,000 ppm oxygen during curing of the coloring layer.

Twist per 305 mm

| Temperature | Time (min.) | NPR | SPR |
|---|---|---|---|
| Unaged | 0 | 10.01 | 7.23 |
| 135° C. | 5 | 9.88 | 6.52 |
|  | 15 | 9.81 | 6.93 |
|  | 30 | 9.67 | 7.04 |
| 135° C. Average |  | 9.79 | 6.83 |
| 155° C. | 5 | 9.74 | 6.66 |
|  | 15 | 9.54 | 7.09 |
|  | 30 | 9.49 | 6.87 |
| 155° C. Average |  | 9.59 | 6.87 |
| 175° C. | 5 | 9.76 | 7.03 |
|  | 15 | 9.76 | 6.95 |
|  | 30 | 9.63 | 7.28 |
| 175° C. Average |  | 9.72 | 7.09 |

Figure 5:
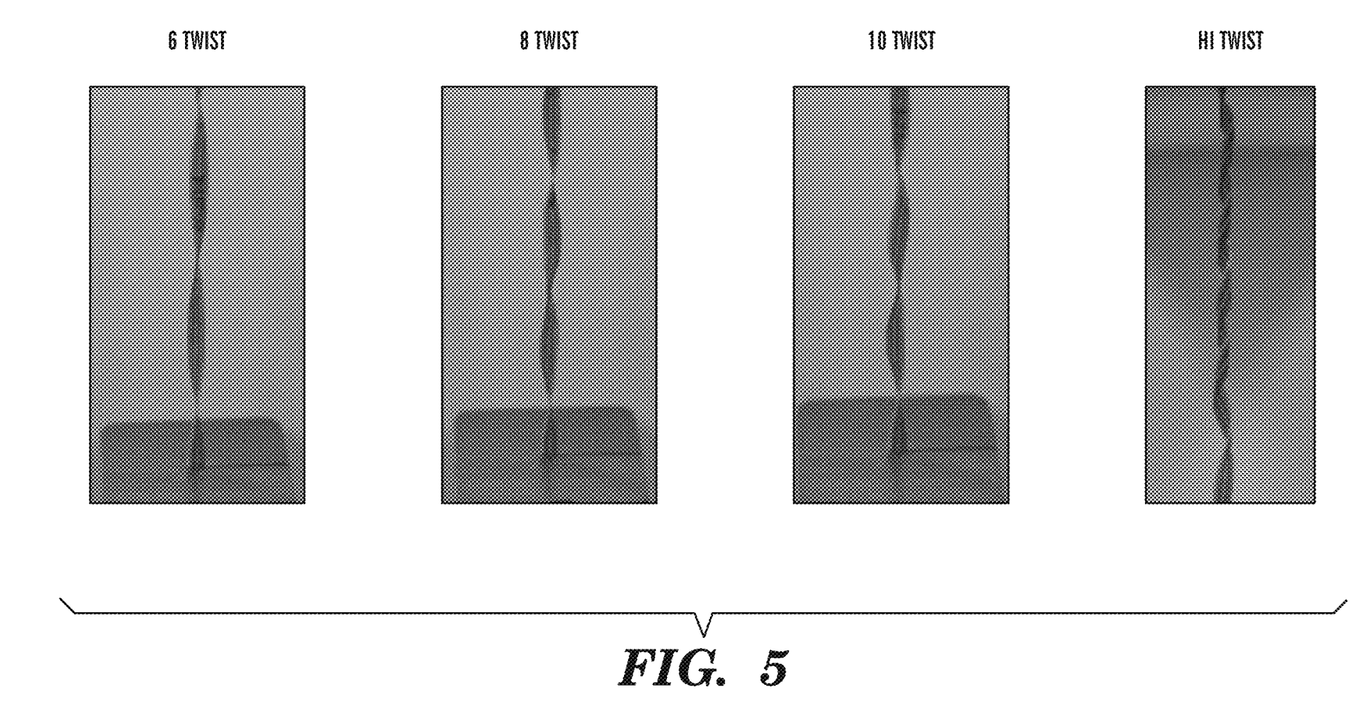
FIG. 5 illustrates optical fiber ribbons undergoing varying degrees of twist.

FIG. 5 illustrates ribbons undergoing varying numbers of twists. Ribbons produced according to the present embodiments are capable of undergoing up to nine or ten twists over a 300 mm length of fiber without signs of failure.

Example 4

NPR Crush Performance

The NPR show improved Crush performance over SPR prepared in accordance with the prior art, as shown in the table below. The resulting increased Crush performance is consistent over temperatures of from 135° C. to 175° C. for up to 30 minutes.

All NPR in the table below were manufactured using 50,000 ppm oxygen during curing of the coloring layer.

Average of Ribbon Crush

| Temperature (° C.) | Time (min.) | NPR | SPR |
|---|---|---|---|
| Initial | Unaged | 322 | 261 |
| 135 | 5 | 370 | 261 |
|  | 15 | 304 | 248 |
|  | 30 | 300 | 247 |
| 155 | 5 | 374 | 288 |
|  | 15 | 357 | 302 |
|  | 30 | 356 | 194 |
| 175 | 5 | 340 | 259 |
|  | 15 | 302 | 237 |
|  | 30 | 323 | 249 |
| Total Average |  | 335 | 255 |

Figure 4:
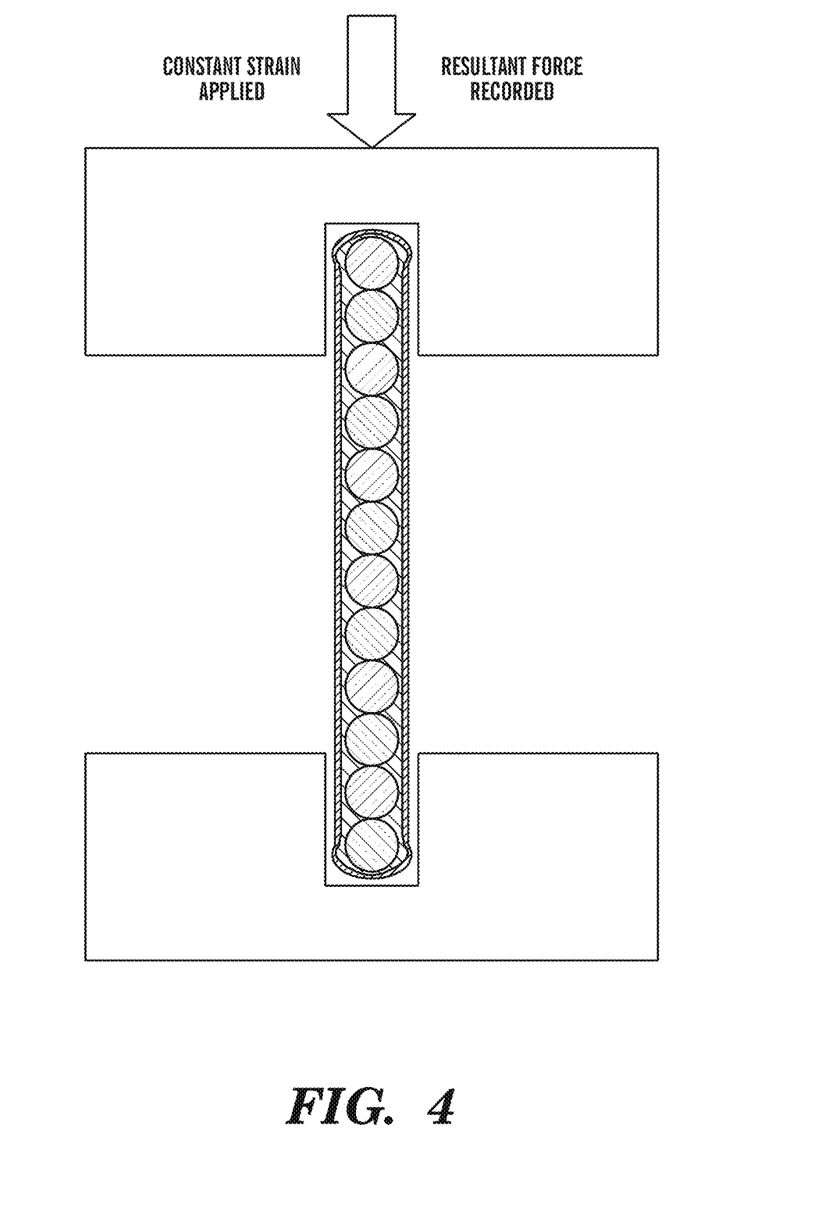
FIG. 4 illustrates crush testing of an optical fiber ribbon.

FIG. 4 illustrates a method of crush testing ribbons. In the crush test, two plates with a slot for the ribbon are mounted on an Instron machine. A constant strain is applied and failure occurs when the force or load suddenly drops.

The foregoing is a description of various embodiments that are given here by way of example only. Although matrix materials have been described with reference to preferred embodiments and examples thereof, other embodiments and examples may perform similar functions and/or achieve similar results. All such equivalent embodiments and examples are within the spirit and scope of the disclosure and are intended to be covered by the appended claims.

We claim:

1. An optical fiber ribbon, comprising:
a plurality of optical fibers;
at least one ink coloring layer applied to one of the optical fibers; and
a ribbon matrix surrounding and encasing the optical fibers;
wherein the ink coloring layer comprises cure-inhibited sites to continue chain propagation when the ribbon matrix is placed in contact with the ink coloring layer during application of the ribbon matrix; and wherein the ink coloring layer is cured to have an Oxygen (O2) content in an amount of between 10,000-100,000 parts per million (ppm) to form cured colored optical fibers.

2. The optical fiber ribbon of claim 1, wherein the ink coloring layer is bonded to the ribbon matrix via cross-linking between the ink coloring layer and the ribbon matrix at the cure inhibited sites.

3. The optical fiber ribbon of claim 1, wherein the ribbon matrix comprises an inner matrix and an outer matrix.

4. The optical fiber ribbon of claim 3, wherein the inner matrix surrounds and encases all of the optical fibers of the ribbon and the outer matrix surrounds and encases the inner matrix.

5. The optical fiber ribbon of claim 4, wherein the inner matrix contacts the ink coloring layer and the outer matrix contacts the inner matrix.

6. The optical fiber ribbon of claim 5, wherein the ribbon has a thickness of 250 to 330 microns at its midpoint, wherein the ink coloring layer has a thickness in the range of 1-10 microns.

* * * * *